(12) United States Patent
Duparré et al.

(10) Patent No.: US 8,675,043 B2
(45) Date of Patent: Mar. 18, 2014

(54) IMAGE RECORDING SYSTEM PROVIDING A PANORAMIC VIEW

(75) Inventors: Jacques Duparré, Jena (DE); Andreas Bräuer, Schlöben (DE); Peter Schrelber, Jena (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 905 days.

(21) Appl. No.: 12/298,373

(22) PCT Filed: Apr. 16, 2007

(86) PCT No.: PCT/EP2007/003340
§ 371 (c)(1),
(2), (4) Date: Mar. 26, 2009

(87) PCT Pub. No.: WO2007/121886
PCT Pub. Date: Nov. 1, 2007

(65) Prior Publication Data
US 2009/0322856 A1    Dec. 31, 2009

(30) Foreign Application Priority Data

Apr. 25, 2006 (DE) .................. 10 2006 019 124

(51) Int. Cl.
*H04N 7/00* (2011.01)
(52) U.S. Cl.
USPC .................. 348/38; 348/37; 348/39
(58) Field of Classification Search
USPC .................. 348/36, 335; 349/95; 709/36–39
See application file for complete search history.

(56) References Cited

U.S. PATENT DOCUMENTS

| 5,159,368 | A | * | 10/1992 | Zemlin | 396/427 |
| 5,497,188 | A | * | 3/1996 | Kaye | 348/36 |
| 6,141,034 | A | | 10/2000 | McCutchen | |
| 6,252,603 | B1 | | 6/2001 | Oxaal | |
| 6,271,853 | B1 | | 8/2001 | Oxaal | |
| 2002/0128538 | A1 | | 9/2002 | Thompson | |
| 2005/0202586 | A1 | * | 9/2005 | Yamanaka et al. | 438/70 |
| 2007/0109438 | A1 | | 5/2007 | Duparre et al. | |
| 2011/0025899 | A1 | * | 2/2011 | Schmaelzle et al. | 348/308 |

FOREIGN PATENT DOCUMENTS

| DE | 102004003013 B3 | 6/2005 |
| WO | WO 2005069607 A1 * | 7/2005 |
| WO | 2007121886 R | 12/2008 |

OTHER PUBLICATIONS

Duparre, Jacques, et al "Thin Compound Eye Camera." Applied Optics vol. 44, No. 15 (May 20, 2005): 2949-2956.

* cited by examiner

*Primary Examiner* — Oanh Duong
(74) *Attorney, Agent, or Firm* — Millen, White, Zelano & Branigan, P.C.

(57) ABSTRACT

The invention relates to an image detection system for a panoramic view comprising linearly disposed optical channels with a microlens and a detector which is situated in the focal plane thereof. The camera unit is thereby mounted on a rotating or rotating-oscillating rotational shaft, as a result of which a panoramic view of the image detection system is made possible. Image detection systems of this type are used in medical technology, on vehicles, for inspection of hole-like recesses and also for 360° image detection in rooms.

39 Claims, 2 Drawing Sheets

Fig. 1A
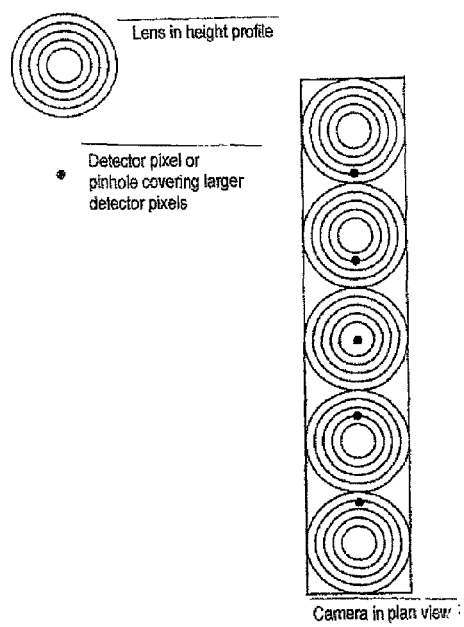
Fig. 1B        Fig. 1C
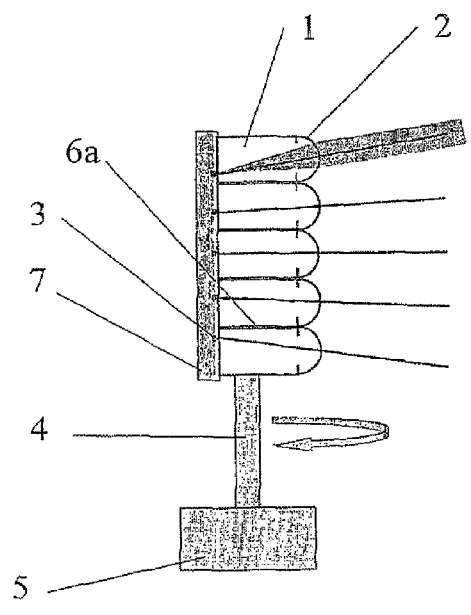     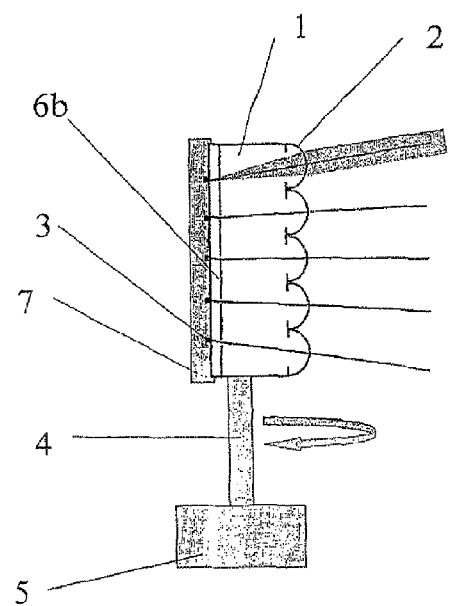

IMAGE RECORDING SYSTEM PROVIDING A PANORAMIC VIEW

The invention relates to an image detection system for a panoramic view comprising linearly disposed optical channels with a microlens and a detector which is situated in the focal plane thereof. The camera unit is thereby mounted on a rotating or rotating-oscillating rotational shaft, as a result of which a panoramic view of the image detection system is made possible. Image detection systems of this type are used in medical technology, on vehicles, for inspection of hole-like recesses and also for 360° image detection in rooms.

A camera is described in DE 10 2004 003 013 B3 in which a linear increase in the inclination of the optical axes from channel to channel is achieved by a difference in the centre spacing of the microlenses and detector pixels. Each channel consequently "looks" in the adjacent direction of the channels abutting thereon. When reading out the detector signals in the form of a matrix, in which the signals of the pixels are registered in a row (and column), the image of the imaged object results without further sorting of the signals of the pixels. It is hence possible, from the coordinate of a channel in the array, to classify its viewing direction within the entire field of view of the camera as a formula, as a result of which a two-dimensional image of a limited field of view is produced. However, a panoramic view or a very large field of view is frequently of interest. Conventional, macroscopic lens systems for this purpose are very complex and expensive and the image quality becomes increasingly poorer towards the edge of the field of view. As a result of distortion, the image becomes distorted above all so that objects can no longer be identified unequivocally. A modulation transmission function (MTF) which is reduced towards the edge of the image field correspondingly reduces the resolution and the light sensitivity likewise drops. As a result of the degrees of freedom in design, described in DE 10 2004 003 013 B3, of systems which image in channels, these problems can be compensated for in part by individual correction of each channel with respect to its individual viewing direction, however, a panoramic view is also precluded here because of the planar construction.

Starting from this state of the art, it was the object of the present invention to provide a camera system which is suitable for a panoramic view.

This object is achieved by the generic image detection system having the characterising features of claim 1 and also by the method for detecting in panoramic view having the features of claim 35. The further dependent claims reveal advantageous developments. Uses according to the invention are mentioned in claims 38 to 41.

According to the invention, an image detection system for a panoramic view is provided, which comprises at least one camera unit having linearly disposed optical channels with a microlens and a detector which is situated in the focal plane thereof and extracts an image point from the microimage behind the microlens. There should be understood here by camera unit, a one-dimensional line of optical channels. The optical axes of the individual optical channels have different inclinations, as a result of which they represent a function of the spacing of the optical channel from the centre of the side of the camera unit orientated thereto, with which the ratio of the size of the field of view to the size of the image field can be determined specifically. The at least one camera unit is mounted on a rotating or rotating-oscillating rotational shaft, as a result of which a panoramic view of the image detection system is made possible.

The image detection system according to the invention represents, by using one or more camera units which are disposed along the axis thereof on a rotating or rotating-oscillating shaft, an image-producing optical system which is free of extra-axial image defects, along the direction of rotation, due to serial photographing of the panoramic view, i.e. photographing always ensures a field of view of a normal size in the form of a line image only in the direction of the optical axes of the channels (perpendicular to the plane of the microlenses) and also perpendicular thereto (in the direction of the line axis).

A plurality of camera units can also be disposed adjacently, i.e. lines instead of only one line, in order to reduce the exposure time per line photograph for example by redundancy of the image photographing and summation of the signals from one viewing direction and hence to increase the speed of rotation of the camera in order to achieve for example a higher image repetition rate of the panoramic image.

The image detection system can thereby rotate permanently or else oscillate rotationally. The rotational shaft is thereby coupled preferably to a drive. Thus a continuous rotation can be made possible by using a motor, whilst a step motor enables a rotation in steps. Oscillation can be achieved for example by means of a coil coupled to a spring.

With respect to the continuous rotation when using a motor, the image detection system preferably has sliding contacts for the electrics or electronics. Furthermore, a system of this type can have optical glass fibres in the rotational centre of the axle or shaft with an end-face coupling or an imaging lens disposed therebetween (so-called "rotational fibre optic interconnect"). A further preferred embodiment provides that an optoelectronic sensor, e.g. an LED or a laser, and a receiver, e.g. a photodiode, are disposed in the rotational shaft situated one opposite the other. Another preferred embodiment relates to the configuration with cable-free data transmission technologies, such as e.g. "Bluetooth". A further variant according to the invention for an optical and hence wireless energy transmission resides in the combination of high power laser diodes with photodiodes and the use of the photocurrent resulting therefrom for energy provision to the camera unit. Also inductive energy- or data transmission variants or the use of microwaves is conceivable.

With respect to the rotational oscillation, a cabled variant can be used preferably, e.g. in optical or electrical form, as long as the cables have sufficient flexibility.

A further preferred embodiment provides that the rotational shaft extends through the centre of gravity of the image detection system in order to achieve a mechanical balance. In this way, imbalances and undesired alteration of the viewing direction of the camera during the rotation perpendicular to the direction of rotation can be avoided. Otherwise, a very stable mechanical construction is required.

Furthermore, it is preferred that the image detection system has additional lighting units. These can be disposed for example between the channels in the form of light-emitting surfaces, in particular LEDs or OLEDs. Likewise, it is possible that these lighting units are disposed to the left and/or to the right of a camera unit, i.e. an image-photographing line.

The camera unit preferably has a length in the line direction of 1 mm to 10 cm and a width of 100 µm to 10 mm. Furthermore, it is preferred that the respective optical channels have a constructional length in the range of 100 µm to 10 mm.

A further preferred variant of the image detection system according to the invention concerns an embodiment in which the mean spacing, i.e. the pitch, of the microlenses differs slightly from the pitch of the detectors in order to ensure a different inclination of the optical axes for the individual channels.

Furthermore, it is preferred that the individual microlenses differ with respect to decentring relative to the detector, the focal width, the conical and/or aspherical parameters and hence enable different inclinations of the optical axes.

Another preferred variant provides that microprisms are integrated in the individual microlenses, which enable different inclinations of the optical axes.

The individual microlenses can be disposed on a basic surface which is curved in the line direction, as a result of which different inclinations of the optical axes can be produced. Likewise, the detectors can be disposed on a basic surface which is curved in the line direction.

Preferably, the optical channels for the different inclinations of the optical axes are free of extra-axial aberrations. A variant according to the invention provides that correction of extra-axial image defects is made possible by using different anamorphic lenses, in particular elliptical cast lenses, for each individual channel. Correction of the astigmatism and of the image field curvature makes it possible that the image remains equally sharp over the entire field of view or image field since the shape of the lens of each channel is adapted individually to the angle of incidence to be imparted. The lens has two different main radii of curvature. The orientation of the ellipses is always such that the axis of one main radius of curvature is in the direction of the increasing angle of incidence and that of the other main radius of curvature is perpendicular thereto. Both main radii of curvature increase with an increasing angle of incidence according to analytically derivable laws, the radii increasing at different rates. An adjustment of the ratio of the main radii of curvature to the length of one individual channel can be effected by adjusting the axial ratio of the ellipse base. The adjustment of the alteration of the radius of curvature from channel to channel is effected by adjusting the size of the axes.

Furthermore, in a variant according to the invention, a correction of the distortion, i.e. of the main beam error angle, can be achieved by adapting the pinhole or detector in the image to a microlens. A correction of the distortion is possible simply by a non-constant pitch difference between lens array and pinhole or detector array. By adapting the position of the pinhole or detector in the image to a microlens according to the position thereof respectively within the entire image detection system and accordingly the viewing direction to be processed, the resulting total image can be produced completely free of distortion. In order to be fitted on a sensor array with a constant pitch, the position of the respective microlens must consequently be offset not only by a multiple of the pitch difference relative to the detector but be adapted to the actual main beam angle to be processed.

A further preferred variant provides that the optical channels have structures which prevent crosstalk of light of one microlens to the detector pixel or pinhole assigned to the adjacent microlens. This prevents crosstalk which leads to a reduced signal-to-noise ratio of the imaging system.

This can be achieved in that the structures consist of channels which are isolated from each other optically. There are included herein light-absorbing walls between these channels.

A further variant according to the invention provides that the structures comprise at least one aperture diaphragm arrangement which is disposed between microlenses and detectors. Likewise, a plurality of aperture diaphragm arrangements can be disposed in different planes between microlenses and detectors. In this case, the aperture diaphragm arrangements preferably have different mean spacings and/or are at a spacing relative to each other with different spacer layers and relative to the detectors or the microlenses.

If it is desired that the optical channels and the microlenses are configured for an enlargement of approx. 1, the object-side dihedral angle which is assigned to each channel as image point is adjusted in the size thereof such that, at the object spacing of the imaging system, the lateral extension which corresponds to this dihedral angle is exactly as large as the spacing of the channels.

Preferably, a first aperture diaphragm arrangement assigned to the microlenses and a second aperture diaphragm arrangement are applied by coating on a transparent lens body at the front and rear. On the first aperture diaphragm arrangement, a microlens array is applied and, on the second aperture diaphragm arrangement, a transparent spacer layer. Under the spacer layer there is situated a substrate with an array of detector pixels, if necessary a perforated screen array being applied on the spacer layer or the substrate with the detector pixels.

Both CMOS and CCD sensors can be used for photoelectric conversion. Thinned and rear-illuminated detectors are particularly attractive here since they are suitable in particular simply for direct connection to the lens and in addition have further advantages with respect to sensitivity. Likewise, it is also possible to use a photosensor array which comprises a polymer.

Preferably, the optical channels respectively have a plurality of detectors of a different function.

With respect to the number of pixels per channel, both the possibility exists according to the invention that one pixel is assigned to each channel or that a plurality of pixels is assigned to each channel. There should be understood by pixel within the scope of this application, a region with the desired spectral sensitivity. A simple arrangement thereby requires only a single electronic pixel per channel for image production. For adapting to the imaging concept, a pixel size of the optoelectronics should be chosen corresponding to the refraction-delimited spot size of approx. 2 to 3 µm, the pixel pitch requiring to be of the order of magnitude of 50 to 100 µm. Use of the free space on the sensor can take place by implementation of intelligent pixel-close signal preprocessing. Many image processing tasks can be dealt with already analogously in the image sensor, e.g. by operation between pixels of adjacent or only slightly remote channels. There are included here for example:

Contrast, contrast direction (edge orientation)

Detection of movement

Resolution increase for point sources (resolution of the position in the field of view for point sources can be achieved far more exactly than the diffraction limit of the lens in that the differences of the signals of adjacent channels are evaluated for the same object point).

Determination of the centre of gravity and of the average extent of an intensity distribution.

By using a plurality of pixels with different properties or pixel groups with pixels of the same properties in the individual channels, a large number of additional image information can be provided. There is included herein:

An increase in resolution beyond the diffraction limit can be achieved, so-called sub-PSF-resolution (PSF=point spread function). For this purpose, groups of tightly packed similar pixels, i.e. 4 to 25 items, must be produced for each channel with a size of ≤1 µm for the individual pixels. The centre of the pixel group is situated at the same position as the individual pixels according to the variant according to the invention in which only one pixel per channel is used. The centre of the pixel group is dependent upon the radial coordinate of the channel in the array under consideration.

Furthermore, the possibility exists of producing an electronic zoom, an electronic viewing direction alteration or an electronic light intensity adjustment. The use of a conventional tightly-packed image sensor with small pixels, e.g. a megapixel image sensor, can be used to photograph all the images produced behind all the microlenses of the array. By selecting only specific pixels from the individual channels for producing the desired image, the enlargement or the field of view can be adjusted since the pixel position in the channel is the function of the radial coordinate of the channel in the array under consideration. Likewise, the viewing direction can be adjusted by simple translation of all read-out pixels. Furthermore, the light intensity can be adjusted by superpositions of the signals of adjacent pixels, the effective pixel size increasing, which leads to a loss of resolution.

By taking into account all the microimages, an increase in resolution can be achieved. For this purpose, a conventional tightly-packed image sensor (megapixel image sensor) can be used to photograph all the images produced behind all the microlenses of the array. The individual microimages have a minimum lateral offset relative to each other due to the different position of the individual channels relative to the centre of the array. Taking into account this minimum displacement of the microimages to form a total image results in a significantly more high-resolution image than when photographing only one image pixel per channel. However, this makes sense only for object spacings which are small compared with the lateral camera extension.

Likewise, coloured photographs are made possible by the arrangement of colour filters in front of a plurality of otherwise similar pixels per channel. The centre of the pixel group is thereby located at the same position as a single pixel in the case of the simple variant with only one pixel per channel, the centre of the pixel group being dependent upon the radial coordinate of the channel in the array under consideration. An electronic angle correction can be necessary. In order to avoid this, a combination with colour image sensors is also possible, the three colour-sensitive detector planes thereof being disposed one above the other and not adjacently.

Furthermore, an increase in light intensity can be achieved without loss of resolution in that a plurality of similar pixels is disposed at a greater spacing in one channel. A plurality of channels therefore look from different places of the camera in the same direction. Subsequent superposition of associated signals increases the light intensity without reducing the angle resolution at the same time. The position of the pixel group relative to the microlens thereby varies minimally from channel to channel so that scanning of the field of view takes place analogously to the variant with only one pixel per channel. The advantage of this variant is that, due to the fact that a plurality of channels produces the same image point at the same time, the noise accumulates only statistically, i.e. it correlates with the root of the number of photons, but the signal accumulates linearly. Hence an improvement in the signal-to-noise ratio results.

A further variant according to the invention provides that an arrangement is chosen in which the optical axes at least of two channel intersect at one object point due to the arrangement of a plurality of pixels per channel. For this purpose, in addition the object width must not be too great relative to the lateral camera extension, i.e. during distance measurement as large a base length as possible of the triangulation is crucial for good depth resolution. Channels which look from different directions towards the same object point should therefore have as large a spacing as possible. The use of a plurality of pixels per channel is thereby sensible in fact for this purpose but not absolutely necessary. As an alternative, channels which are directly adjacent can also be disposed with respectively only one pixel, said channels looking however in very different directions so that they enable intersection of the optical axes with pairs of channels on the opposite side of the camera. Due to this arrangement, a stereoscopic 3D-image photograph or distance measurement, i.e. triangulation, is made possible since for this purpose the same object point must be viewed from different angles.

By using a plurality of detector pixels per channel, the necessary number of channels can be reduced. One channel can cover different viewing directions at the same time by using a plurality of detector pixels which are decentred differently relative to the microlens. Fewer required channels hence means that the total surface area of the camera becomes smaller. Anamorphic or elliptical lenses can be used nevertheless for correction of extra-axial image defects if the detector pixels are disposed mirror-symmetrically relative to the centre of the microlens since they correct the angle of incidence respectively.

A further variant provides the possibility of colour photographs by means of diffractive structures on or in front of the microlenses, these gratings being able to be constant optionally over the array but also being able to have variable parameters from channel to channel, such as orientation, blaze or period (structured gratings). A plurality of similar pixels of a suitable spacing in one channel pick up the spectrum which is separated spatially by the grating. In general, the grating can be replaced also by other dispersive elements which enable diffraction of different wavelengths to separate pixels. The simplest conceivable case for this would be the use of chromatic transverse aberrations for colour division, additional elements in total being able to be dispensed with.

Another variant concerns the polarisation sensitivity of the camera. For influencing this, differently orientated metal gratings or structured polarisation filters can be disposed in front of otherwise similar electronic pixels in each channel. The centre of the pixel group is located at the same position as the individual pixels in the case of the system which has one pixel per channel and is dependent upon the radial coordinate of the channel in the array under consideration. As an alternative, the polarisation filters can also be integrated in the plane of the microlenses, e.g. applied on the latter, one channel then being able to detect only one specific polarisation direction. Adjacent channels are then equipped with differently orientated polarisation filters.

A further variant provides an imaging colour sensor, adaptation to the colour spectrum to be processed, alternatively to the normally implemented RGB colour coding, being effected here by corresponding choice of the structured filters.

The pixel geometry can be adapted arbitrarily to the symmetry of the imaging task, e.g. alternatively to the Cartesian arrangement according to FIG. 11a, a radially-symmetrical (FIG. 11b), a hexagonal (FIG. 11c) or an arrangement of the facets which are adapted otherwise in their geometry can be chosen.

According to a further embodiment, a combination with liquid crystal elements (LCD) can also be effected. The polarisation effects can be used in order to dispose for example electrically connectable or displaceable or polarisable perforated screens over otherwise fixed, tightly-packed detector arrays. As a result, a large number of degrees of freedom of the imaging is achieved.

The functions described here can also be achieved by integration of the structures/elements which distinguish the pixels of the individual channel in the plane of the microlenses. Again, only one electronic pixel per channel is then hereby necessary and the channels differ in their optical functions and not only in their viewing directions. A rougher and simpler structuring of the electronics is the positive result. The possibly required larger number of channels and the therewith associated greater lateral spatial requirement for a balanced resolution is a disadvantage. Also a combination of a plurality of different pixels per channel with different optical properties of different channels can be sensible. Since the described system can be produced on wafer scale, it is possible to increase the light intensity of the photograph by isolating not individual cameras but whole groups (arrays of cameras) in that simply a plurality of cameras photograph the same image (angle correction can be necessary) and these pictures are then superimposed electronically.

Furthermore, it is preferred that the at least one camera unit and the drive are set in a glass or plastic material housing. The housing of the image detection system can thereby be effected for example in glass or plastic material tubes. By covering the end faces of these tubes, a hermetic seal can be effected, only a few cables requiring to be led out of the entire system.

According to the invention, a method for detecting images in a panoramic view is likewise provided in which the previously described image detection system according to the invention is used.

A first variant of the method control is based on the fact that the at least one camera unit is rotated about the axis of rotation at such a low speed that the image is produced with one revolution of 360°, i.e. one complete revolution of the camera. Each revolution hence provides a new image.

A second variant of the method according to the invention provides that the at least one camera unit is rotated about the axis of rotation at such a high speed that the image is produced after several revolutions of 360° by redundant image photographing and subsequent summation of the signals. A correct synchronisation of speed of rotation and summation rate is hereby required.

Since the camera in addition rotates further even during such a short exposure time, care must be taken that the blurring of the image information by further rotations during the integration time of a line image is not substantially greater than the blurring of the line image by the MTF of the static arrows. On the other hand, by measuring the difference with a slight alteration in viewing direction of the lines by rotation, the resolution, e.g. for edge detection, can be significantly increased. This is effected by partial overlapping of the viewing direction of the channels and correspondingly taking the signals into account.

The image detection system according to the invention is used in all fields in which a panoramic view within a compact imaging optical system is of interest. There are included herein for example the inspection of holes of any type, just as 360° image detection in rooms. Another application field is medical technology, e.g. in endoscopy. The image detection system according to the invention can thus be accommodated for example in an endoscope, the image of the endoscope environment being provided over the entire circumference and a specific length in the form of a cylindrical surface.

A further application field is the use of the image detection system according to the invention on vehicles.

The image detection system according to the invention is intended to be explained in more detail with reference to the subsequent Figures without wishing to restrict said system to the special embodiments shown here.

FIG. 1A shows a camera unit according to the invention in plan view.

FIG. 1B shows a variant of the image detection system according to the invention in side view as a sectional representation.

FIG. 1C shows a second variant of the image detection system according to the invention in side view, represented as a sectional representation.

Figure 2:
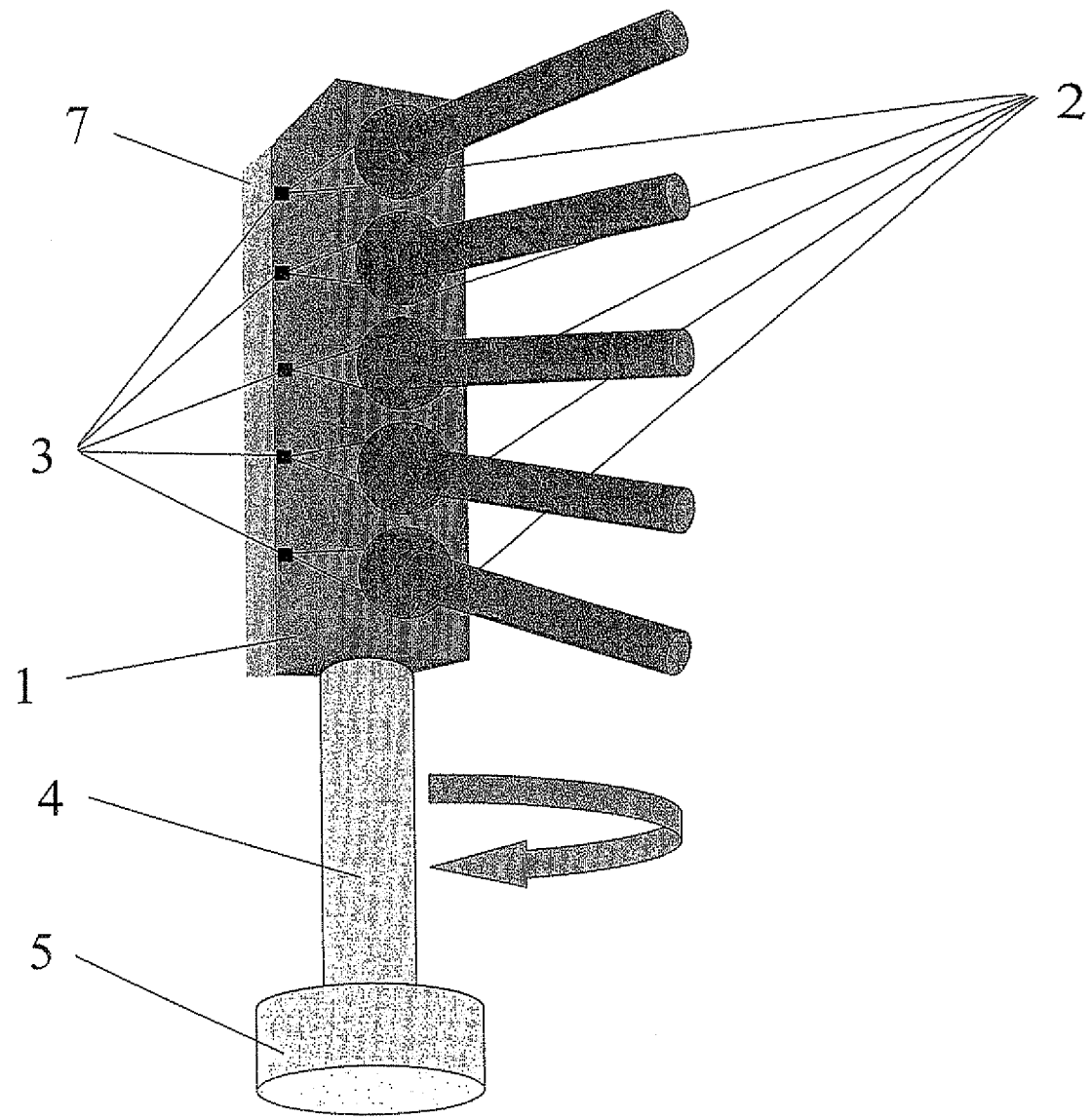
FIG. 2 shows an image detection system according to the invention in a three-dimensional representation.

A camera unit according to the invention with vertically disposed microlenses is represented in FIG. 1A. The individual microlenses are hereby represented by means of contours. The black points disposed in FIG. 1A represent the detector pixels or pinholes which cover larger detector pixels.

In FIG. 1B, a side view of an image detection system according to the invention is represented. The lens body 1 is provided with a plurality of microlenses 2 with associated aperture diaphragms. This unit is accommodated on a receiver- or detector pixel substrate 7 in or on which a printed circuit board, not illustrated, is disposed. The detector pixels 3 or detector pixels of a larger surface area covered by smaller pinholes are illustrated here. The camera unit is thereby disposed on a moveable rotational shaft 4 which is connected to a drive 5. This variant represented here involves a rotating rotational shaft. In order to suppress phantom images, the image detection system represented here has absorbing walls between the individual channels in order to prevent crosstalk of light of one microlens to the detector pixel or pinhole assigned to the adjacent microlens.

FIG. 1C corresponds to the construction of the image detection system according to FIG. 1B, an additional aperture diaphragm array 6b being however disposed here between microlenses and detectors for suppression of phantom images.

In FIG. 2, an image detection system according to the invention is shown in three-dimensional representation. The object body 1, on which the microlenses 2 are disposed, is accommodated on a receiver- or detector pixel substrate 7. These elements together with a printed circuit board, not illustrated, form the camera unit according to the invention. The camera unit is disposed on a rotational shaft 4 which is connected to a drive 5. The variant represented here is also based on a rotating rotational shaft.

The invention claimed is:

1. Image detection system for a panoramic view comprising one camera unit wherein the camera unit has a side that is oriented towards an image, said camera unit comprising:
a single one-dimensional line of optical channels, having linearly disposed optical channels with spacing between them, wherein the optical channels include a microlens and a detector wherein the detector is positioned in a focal plane of the microlens and extracts an image point from a microimage behind the microlens, wherein individual optical channels have optical axes with different inclinations, wherein the inclinations of said optical axes are determined by a position of the individual optical channels relative to the camera unit's center on the side of the camera unit that is orientated towards the image, wherein
the image detection system provides a field of view with a size and an image field with a size wherein a ratio of the size of the field of view to the size of the image field can be determined specifically, and wherein
the camera unit is mounted on a rotating or rotating-oscillating rotational shaft and wherein the optical channels and the microlenses are configured for an enlargement of 1, wherein an object-side dihedral angle is assigned to each channel as an image point and wherein the object-side dihedral angle is adjusted in size such that, a lateral extension which corresponds to the dihedral angle is exactly as large as the spacing of the channels at an object spacing of the image detection system.

2. The image detection system of claim 1, wherein the rotational shaft is coupled to a drive, in particular a motor, a step motor or a coil in conjunction with a spring.

3. The image detection system of claim 1, wherein the rotational shaft extends through the center of gravity of the image detection system in order to avoid an imbalance.

4. The image detection system of claim 1, wherein the image detection system has in addition lighting units.

5. The image detection system of claim 4, wherein the lighting units are disposed between the optical channels or in a line next to the optical channels.

6. The image detection system of claim 1, wherein the camera unit has a line direction with a length of 1 mm to 10 cm.

7. The image detection system of claim 1, wherein the camera unit has a width of 100 ktm to 10 mm.

8. The image detection of claim 1, wherein the optical channels have a constructional length of 100 μm to 10 mm.

9. The image detection system of claim 1, wherein the mean spacing of the microlenses differs slightly from a pitch of the detectors in order to ensure a different inclination of the optical axes for the individual channels.

10. The image detection system of claim 1, wherein the individual microlenses differ with respect to decentring relative to the detector, the focal width, the conical and/or aspherical parameters and hence enable different inclinations of the optical axes.

11. The image detection system of claim 1, wherein microprisms are integrated in the individual microlenses, which enable different inclinations of the optical axes.

12. The image detection system of claim 1, wherein the individual microlenses are disposed on a basic surface which is curved in the line direction and hence enable different inclinations of the optical axes.

13. The image detection system of claim 1, wherein the detectors are disposed on a basic surface which is curved in the line direction.

14. The image detection system of claim 1, wherein the optical channels for the different inclinations of the optical axes are free of extra-axial aberrations.

15. The image detection system of claim 1, wherein the individual optical channels have different pitch differences between microlens and detector and/or pinhole for correction of a distortion.

16. The image detection system of claim 1, wherein the optical channels have structures which prevent crosstalk of light of one microlens to the detector pixel or pinhole assigned to the adjacent microlenses.

17. The image detection system of claim 16, wherein the structures consist of at least one aperture diaphragm arrangement which is disposed between microlenses and detectors.

18. The image detection system claim 17, wherein a plurality of aperture diaphragm arrangements is disposed in different planes between microlenses and detectors.

19. The image detection system of claim 18, wherein the aperture diaphragm arrangements have different mean spacings and/or are at a spacing relative to each other with different spacer layers and relative to the detectors or the microlenses.

20. The image detection system of claim 17, wherein a first aperture diaphragm arrangement assigned to the microlenses and a second diaphragm arrangement are applied by coating on a transparent lens body at the front and rear, a microlens array is disposed on the first aperture diaphragm arrangement and a transparent spacer layer on the second aperture diaphragm arrangement and a substrate with an array of detector pixels is situated under the spacer layer.

21. The image detection system of claim 20 wherein a perforated screen array is applied on the spacer layer or the substrate with the detector pixels.

22. The image detection system of claim 1, wherein light-absorbing walls are disposed between the channels for optical isolation of the channels.

23. The image detection system of claim 1, wherein at least a part of the microlenses is anamorphic.

24. The image detection of claim 1, wherein the detectors are present as a CCD, a CMOS photosensor array and/or a photosensor array consisting of a polymer.

25. The image detection system of claim 1, wherein the optical channels respectively have a plurality of detectors of a different function.

26. The image detection system of claim 1, wherein a pixel is assigned to each optical channel.

27. The image detection system of claim 1, wherein a plurality of pixels is assigned to each optical channel.

28. The image detection system of claim 27, wherein a plurality of pixels with different properties or groups of pixels of the same properties are present.

29. The image detection system of claim 27, wherein colour filters are disposed in front of a plurality of similar pixels.

30. The image detection system of claim 27, wherein a plurality of similar pixels is disposed at a greater spacing in one optical channel in order to increase the light intensity without loss of resolution.

31. The image detection system of claim 27, wherein the plurality of pixels per optical channel is disposed such that the optical axes of at least two optical channels intersect at one object point in order to enable a stereoscopic 3D image photograph and/or a distance measurement.

32. The image detection system of claim 27, wherein dispersive elements for color photographs are disposed in front of or on the microlenses.

33. The image detection system of claim 27, wherein differently orientated gratings or structured polarization filters are disposed in front of similar pixels of one optical channel in order to adjust the polarization sensitivity.

34. The image detection system of claim 1, wherein the at least one camera unit and the drive are set in a glass or plastic material housing.

35. A method for detecting images in a panoramic view comprising:
  detecting an image in the panoramic view with an image detection system, wherein the detecting the image comprising:
  orienting towards the image by a side of at least one camera unit of the image detection system, wherein said camera unit comprising: a single one-dimensional line of optical channels, having linearly disposed optical channels with spacing between them, wherein the optical channels include a microlens and a detector wherein the detector is positioned in a focal plane of the microlens;
  extracting an image point from a microimage behind the microlens, wherein individual optical channels have optical axes with different inclinations;

determining the inclinations of said optical axes by a position of the individual optical channels relative to the camera unit's center on the side of the camera unit that is orientated towards the image;

providing, by the image detection system, a field of view with a size and an image field with a size, wherein a ratio of the size of the field of view to the size of the image field can be determined specifically, and wherein the camera unit is mounted on a rotating or rotating-oscillating rotational shaft;

configuring the optical channels and the microlenses for an enlargement of 1, wherein an object-side dihedral angle is assigned to each channel as an image point;

adjusting the object-side dihedral angle in size such that, a lateral extension which corresponds to the dihedral angle is exactly as large as the spacing of the channels at an object spacing of the image detection system; and rotating said at least one camera unit about the axis of rotation that the image is produced with one revolution of 360° or after several revolutions of 360° by redundant image photographing and subsequent summation of signals.

36. The method of claim 35 wherein the method is performed in endoscopy.

37. The method of claim 35 wherein the method is performed for inspection of hole-like recesses.

38. The method of claim 35 wherein the method is performed on vehicles.

39. The method of claim 35 wherein the method is performed for 360° image detection in rooms.

* * * * *

UNITED STATES PATENT AND TRADEMARK OFFICE
CERTIFICATE OF CORRECTION

PATENT NO. : 8,675,043 B2
APPLICATION NO. : 12/298373
DATED : March 18, 2014
INVENTOR(S) : Duparré et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1185 days.

Signed and Sealed this
Twenty-ninth Day of September, 2015

Michelle K. Lee
*Director of the United States Patent and Trademark Office*